US006436602B1

(12) United States Patent
Imahara et al.

(10) Patent No.: US 6,436,602 B1
(45) Date of Patent: Aug. 20, 2002

(54) METHOD OF REPAIRING A DEFECTIVE PORTION IN AN ELECTRONIC DEVICE

(75) Inventors: Kazumitsu Imahara, Ohtsu; Kakehiko Wada, Ibaraki, both of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/607,450

(22) Filed: Jun. 30, 2000

(30) Foreign Application Priority Data

Jun. 30, 1999 (JP) ............................................ 11-185241

(51) Int. Cl.[7] .............................. G02F 1/13; B23K 26/00
(52) U.S. Cl. ........................ 430/199; 430/945; 349/192
(58) Field of Search .................................. 430/199, 945; 349/192

(56) References Cited

U.S. PATENT DOCUMENTS 5,480,812 A * 1/1996 Salisbury ....................... 437/3

FOREIGN PATENT DOCUMENTS

| JP | 6011675 | 1/1994 |
| JP | 7253583 | 10/1995 |
| JP | 8150487 | 6/1996 |
| JP | 9230128 | 9/1997 |
| JP | 1020115 | 1/1998 |
| JP | 2000-031013 A | * 1/2000 |

* cited by examiner

*Primary Examiner*—John A. McPherson
(74) *Attorney, Agent, or Firm*—Robert M. Trepp

(57) ABSTRACT

A method is described for repairing failure points, regions or locations in an electronic device to have a perfect function when a semiconductor device including an LCD or other electronic device has defects. Described is a method of transferring a single or multi-layer thin film piece into a recess with the physical properties of the thin film piece unchanged. An electronic device is described incorporating a substrate; and a plurality of thin films laminated on the substrate and part of the thin films are formed on a predetermined circuit pattern, wherein a transfer film for repairing a defect is fitted into a recess where the low layers of the thin films are exposed by removing part of a single or multi-layer thin films covering a defective portion included on the thin films and its surrounding portion. Further, a method of repairing a defective portion included in the electronic device comprises the steps of: removing the thin films covering the defective portion and its surrounding portion to form a recess and exposing the lower layers of the thin films; and fitting a transfer film into the recess to attach the transfer film onto the exposed thin films.

18 Claims, 10 Drawing Sheets

METHOD OF REPAIRING A DEFECTIVE PORTION IN AN ELECTRONIC DEVICE

FIELD OF THE INVENTION

The present invention relates to an electronic device and a defect repair method thereof. More specifically, it relates to a method of repairing failure points of an electronic device to have a perfect function and a repaired electronic device.

BACKGROUND OF THE INVENTION

An Extended Video Graphics Array (XGA) Liquid Crystal Display (LCD) having 1024×768 pixels has approximately 2.36 million pixels. Each pixel is driven by a Thin Film Transistor (TFT). It is very difficult to manufacture sub-pixels without any defects in the manufacturing process of such LCD. For this reason, a limited number of point, region or location defects are ordinarily allowed.

There is a case where one defective sub-pixel can cause a malfunction, which causes a picture element to generate different colors or bright points appear when a black color should appear. In this case, an entirely different color from peripheral colors appear or only one point shines in white color when filling all of the display completely with black color, which leads to low contrast of the screen. Consequently, point defects appear on the display. One of the methods for repairing point defects is disclosed in Japanese Laid-Open Patent Publication No. 6-11675, for example. The method is to change bright point defects to dark point defects by covering the bright point defective portion with black color or leaving an ink of a heat transfer sheet on the bright point defective portion. Or, defects are repaired by a self-leak method which is a fake repair method to make dark/bright points to be inconspicuous dots. Either of these methods were not repair solutions to remove defects because these methods only make dark/bright points to be inconspicuous dots. It was unavoidable that a remarkable yield loss occurred when we addressed severe requirements from customers such as "Point defect free".

The Japanese Laid-Open Patent Publication No. 9-230128 discloses a method that a defective filter is removed with a YAG (Yttrium Aluminum Garnet) laser beam and then the colored layer is transferred to the portion where the filter previously existed. Further, the Japanese Laid-Open Patent Publication No. 7-253583 and No. 8-150487 or the like disclose repair methods for defective conductor sections or insulator sections. Such methods are effective for removing defects. These methods were not, however, applicable to such materials as semiconductor layers because materials free of discoloring and deterioration were exclusively used even when being melted by heating. That was resulted from the need for temporally melting the colored layer and the conductors or the like using a semiconductor laser beam. Furthermore, it was impossible to repair a thin film comprising 2 layers or more simultaneously.

It is an object of the present invention to provide a method of repairing a failed point, region, location or pixel to have a perfect function when a semiconductor device including an LCD or other electronic device has defects.

It is another object of the present invention to transfer a single or multi-layer film to the other portion with its characteristics unchanged.

SUMMARY OF THE INVENTION

In accordance with the present invention, an electronic device is described comprising a substrate; a plurality of thin films laminated on the substrate and part of thin films are formed on a predetermined circuit pattern, wherein a transfer film for repairing a defect is fitted into a recess where the low layers of the thin films on the junction surface are exposed by engraving the defective points of the predetermined circuit pattern. It is difficult to remove point defects completely in highly integrated elements . . . such as an LCD. The defective points are removed to plant normal portions on a recess, which leads to removal of the point defects. Then, a thin film free of defects and a transfer film having an element configuration are fitted into the recess. Consequently, electric conductivity is secured on a point of circuit open by the transfer film fitted onto it. When the transfer film has an element configuration, the recess, where the transfer film is fitted into, acts as a regular element.

The present invention further provides a method of repairing a defective portion included in an electronic device in which a plurality of thin films are laminated on a substrate and part of thin films are formed on an arbitrary circuit pattern, comprising the steps of removing the thin films covering the defective portion and its surrounding portion to form a recess and exposing the lower layers of the thin films; and fitting a transfer film into the recess to attach the transfer film onto the exposed thin films. Using this defect repair method, a defective portion is firstly removed to form a recess and then a transfer film composed of a single or multi layers is transferred to the recess formed in a solid state without being melted, that is, the transfer film is fitted into the recess. Accordingly, even in the case of the transfer film composed of multi-layers, the defective portion of the electronic device is supposed to be mended to have an almost perfect function with functions and configuration undamaged. An electronic device free of point defects can be obtained by repairing all point defects.

The present invention further provides a defect repair apparatus comprising an ultrashort pulse laser generator for adjustably generating an ultrashort pulse laser;

a flexible mask pattern generator for forming an ultra short pulse laser applied by the ultrashort pulse laser generator into a predetermined shape; an optical system for converging the ultrashort pulse laser beam;

a first stage for positioning an electronic device to be repaired thereon;

a second stage for positioning a target plate thereon; and a retention apparatus for maintaining a predetermined gap between the electronic device placed on the first stage and the target plate placed on the second stage. This defect repair apparatus particularly has the first stage where the electronic device is mounted on and the second stage for placing the target plate to perform easy positioning between the micromachined electronic device and the target plate. The electronic device and the target plate are maintained at a predetermined gap by applying proper pressure onto the first and the second stages positioned. This allows a transfer of the transfer film to the recess without any displacement and any damage.

BRIEF DESCRIPTION OF THE DRAWING

These and other features, objects, and advantages of the present invention will become apparent upon consideration of the following detailed description of the invention when read in conjunction with the drawing in which:

FIG. 2(A) is a front cross-sectional view.

FIG. 3(A) is a front cross-sectional view.

DESCRIPTION OF THE PREFERRED EMBODIMENTS OF THE INVENTION

The preferred embodiments of the present invention will now be described in detail with reference to FIGS. 1 to 12 of the drawings.

Figure 1:
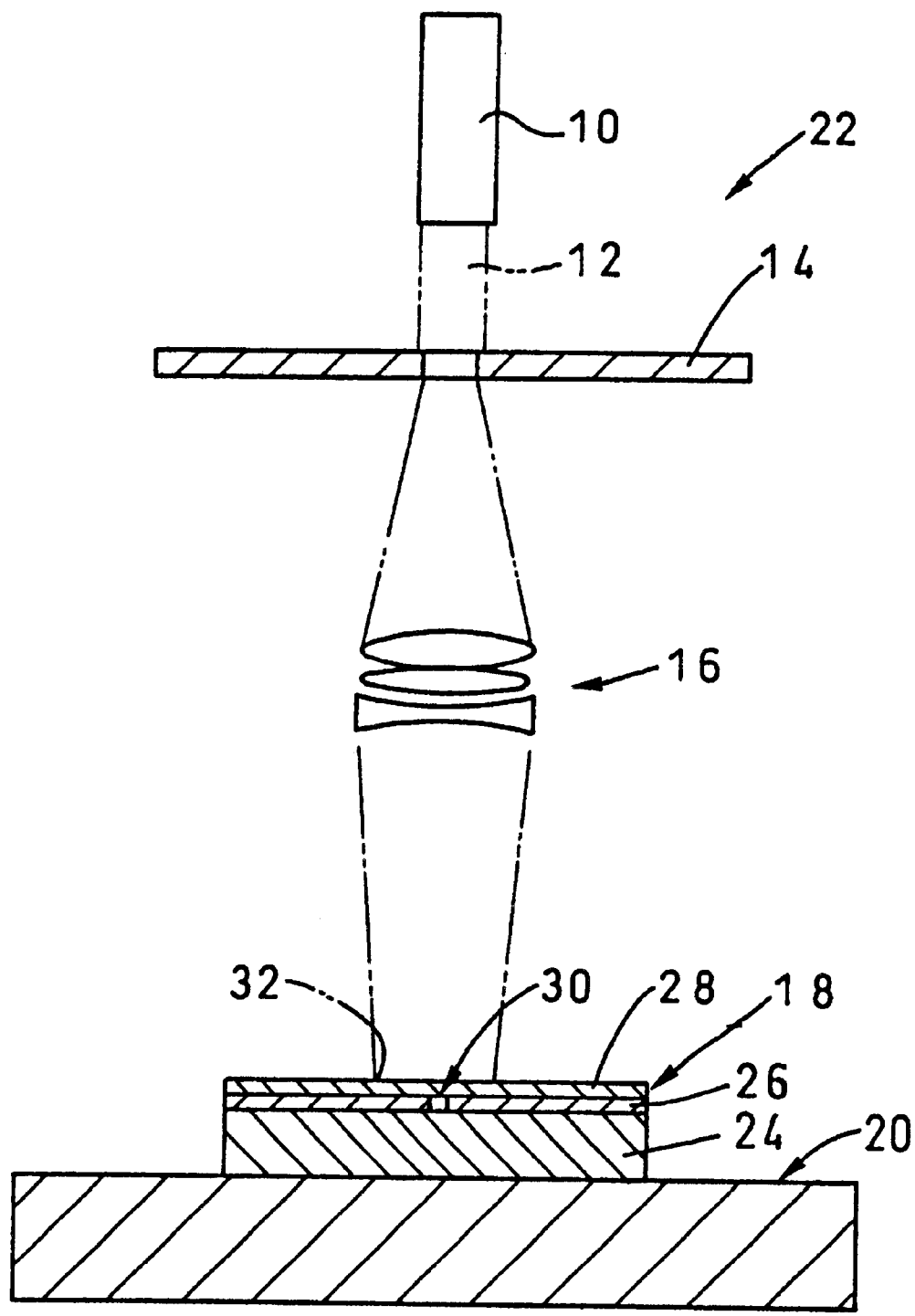
FIG. 1 is a schematic cross-sectional view for showing a process in one preferred embodiment of a method of repairing a defective portion of an electronic device according to the present invention.
Figure 2:
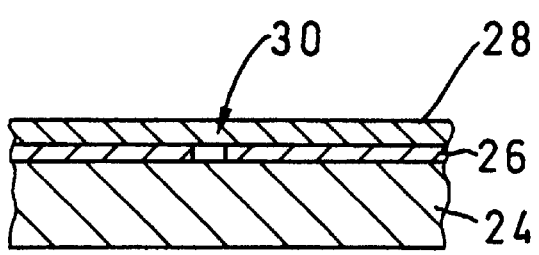
FIGS. 2(A) and (B) are schematic cross-sectional views of enlarged main parts of an electronic device used for the defect repair method shown in FIG. 1.
FIG. 2(B) is a top plan view.
Figure 2:
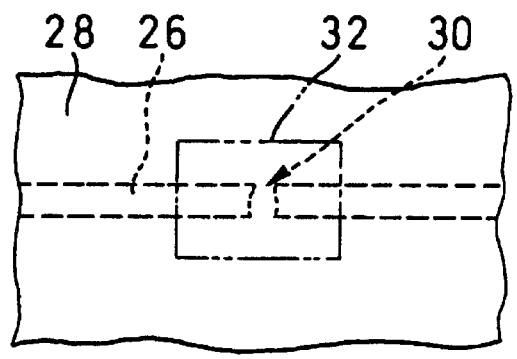
Figure 3:
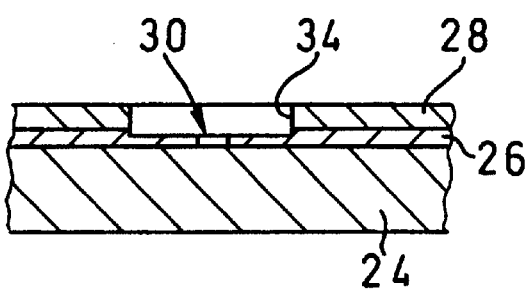
FIGS. 3(A) and (B) are schematic views of enlarged main parts of an electronic device used for the defect repair method in the next process of the preferred embodiment shown in FIG. 1.
FIG. 3(B) is a top plan view.
Figure 3:
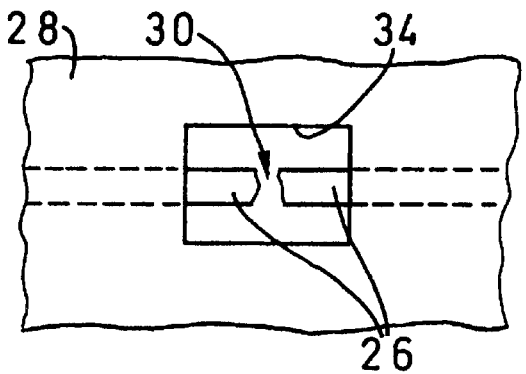

The defect repair apparatus employed for the method of repairing a defective portion of the electronic device comprises, at least:

an ultrashort pulse laser generator 10 for adjustably generating an ultrashort pulse laser;

a flexible mask pattern generator 14 for forming an ultrashort laser pulse 12 applied by the laser generator 10 into an arbitrary shape;

an optical system 16 for increasing its intensity along with focusing the laser, and;

a first stage 20 moving an object electronic device 18 for positioning as shown in FIG. 1.

A femtosecond laser having a pulse width (output waveform length) ranging from several femtoseconds (fs=$10^{-15}$s) to several thousand femtoseconds (fs) is preferably used as an ultrashort laser pulse 12. An excimer laser or the like is also usable. Little thermal diffusion is noticeable by the end of the pulse as the pulse width is getting smaller, such as when the pulse width of the laser is several ps ($10^{-12}$s) or less, particularly, 1 ps or less. Further, the thermal or temperature gradient of the surface or the interior of the solid gets sharply steeper. For this reason, little thermal transform or damage in the material can be found on abrasion marks or laser spots machined by the ultrashort laser pulse 12, particularly, at its marginal area. In addition, the machined surface becomes smooth and flat. The laser 12 is, therefore, convenient for repairing a defective portion to prevent a thin film and a transparent electrode having a high risk of bringing about thermal denaturation from bringing about thermal denaturation.

The wavelength of the ultrashort laser pulse 12 is preferably 380 nm or more when the laser 12 passes through a transparent substrate, for example, a glass plate. That is because the laser 12 is not absorbed into the glass plate when the laser 12 is applied from the side of the glass plate. Accordingly, when the transparent substrate such as a transfer plate described later is formed by a quartz glass and a melted glass or a rock salt, or the like, the wavelength, at which the laser 12 may pass through the transparent substrate, is selected. On the other hand, the wavelength of the laser 12, which is the wavelength when the laser is absorbed into an object thin film formed on the transparent substrate, is selected according to the kind of the thin film.

A laser utilizing a crystal such as Ti:Sapphire, Cr:LiSAF or an XeCl laser is preferably used as an ultrashort pulse laser generator 10. This laser generator 10, which can properly set the pulse frequency of the ultrashort laser pulse 12 applied by the generator, is used.

Ultrashort laser pulse 12 applied by the ultrashort pulse laser generator 10 is used for two uses. More specifically, one is used for gradually removing the irradiated surface of the thin film by applying laser 12 on the side of the thin film and the other is used for punching out the layer of the thin film placed on the transparent substrate where the laser 12 is absorbed by applying ultrashort laser pulse 12 from the side of the transparent substrate. One example of respective machining conditions indicates that when laser generator 10 is used for gradually removing the irradiated surface of the thin film, particularly when a metal is removed, the power density of laser generator 10 is set ranging from 0.1 to 2.0 Jule/cm$^2$, although it depends on the type of metal. When ITO (indium tin oxide) is removed, the power density is set around 0.4 Jule/cm$^2$. On the other hand, when laser generator 10 is used for punching out the thin film layers, particularly, a metal is punched out, the power density of the laser generator 10 is set ranging from 0.1 to 4.0 Jule/cm$^2$ according to the kind of metal. When ITO is removed, the power density is set around 0.8 Jule/cm$^2$.

Next, a flexible mask pattern generator 14 molding the ultrashort laser pulse 12 applied by the ultrashort pulse laser generator 10 is constructed by an apparatus such as a crystal liquid shutter, for example. The structure of the flexible mask pattern generator 14 or the like is not limited, as long as it can mold the plane shape of the laser 12 passing through flexible mask pattern 14 in a desirable shape including the area of the electronic device 18 to be repaired with minor adjustments.

Since publicly known apparatuses can be used for an optical system 16 and a first stage 20, their structures are not particularly limited. The optical system 16 may not be only a pass-through type, but also a reflection type, which is so composed that the optical system 16 can accurately focus the ultrashort laser pulse 12 applied by the ultrashort pulse laser generator 10 on an element or a part within the electronic device 18 placed on the first stage 20. This optical system 16 may comprise a half mirror or the like, other light generation source and optical system for positioning and minor adjustments. The first stage 20 is required at least to move toward the horizontal axial. An apparatus capable of making minor adjustments in μm is particularly used for the first stage 20.

The use of a defect repair apparatus 22 composed of the above configuration will now be described in detail. At first, an electronic device 18 having a defective portion is placed on the first stage 20 of the repair apparatus 22. The electronic device 18 used for the repair method of the present invention is not particularly limited, if it has certain functions such as an attachment of a thin film on a substrate 24 for wiring predetermined circuit patterns, and forming the thin film on the electrode, semiconductor layer or protective layer, or the like. More specifically, an LCD apparatus, an image sensor, and an LSI or the like are used as an electronic device 18. In this embodiment, part of the electronic device 18, wherein the wiring 26 is formed on the substrate 24 and covered with a protective film 28, for example, a signal line or a gate line in the LCD will be described as examples.

For the electronic device 18 placed on first stage 20, the position of a point region or location of circuit open 30, which is a defect, is determined as shown in FIGS. 2(a) and (b). In addition, an area 32 where the protective film 28 including the point of circuit open 30 to be removed is set by operating the flexible mask pattern generator 14 to set the area of the ultrashort laser pulse 12 applied by the ultrashort pulse laser generator 10. The lowered output of the laser generator 10 or placing the laser of the other laser generator for adjustments, which is not shown in the drawings, performs this positioning and the setting of the area 32.

Then protective film 28 over the point, region or location of circuit open 30 in electronic device 18 is gradually removed to form a depression, for example, concave using the ultrashort laser pulse 12 generated by the ultrashort pulse laser generator 10. The power density of the laser generator 10 in this case, for example, in the case of ITO, is preferably set around 0.4 Jule/cm². Recess 34 is formed and broken wiring 26 is at least exposed as shown in FIGS. 3(a) and (b). It is preferable to secure an electrical connection by slightly removing the surface of the wiring 26, in other words, by leaving at least part of the surface after removing the rest as described later.

Figure 4:
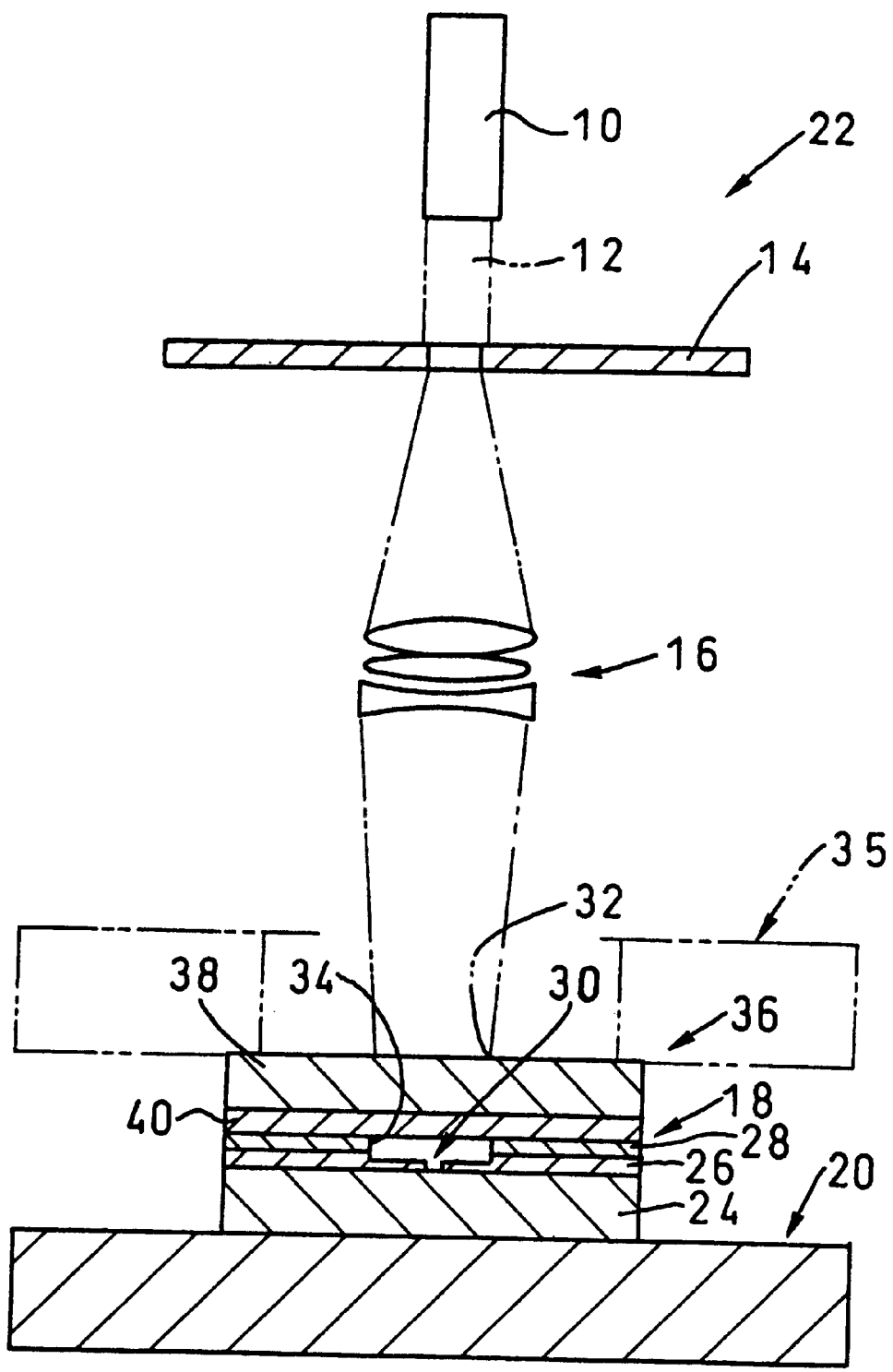
FIG. 4 is a schematic cross-sectional view of an electronic device showing a further next process of the defect repair method in the preferred embodiment shown in FIG. 1.
Figure 5:
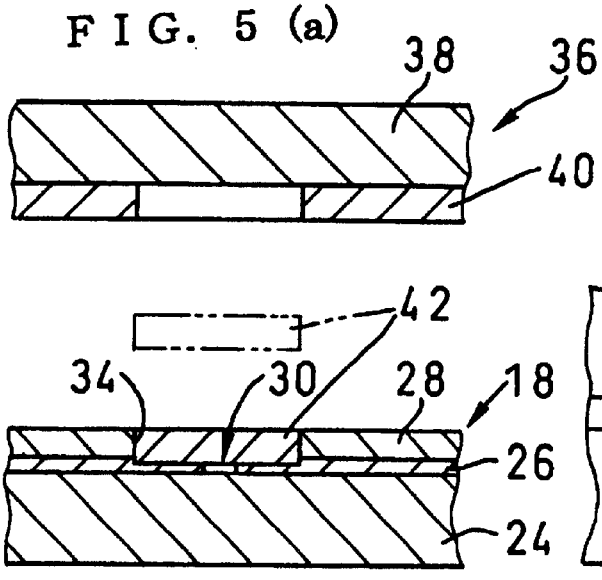
FIGS. 5(A) and (B) are schematic cross-sectional views of enlarged main parts of an electronic device in a further next process in the defect repair method of the preferred embodiment shown in FIG. 1.
Figure 5:
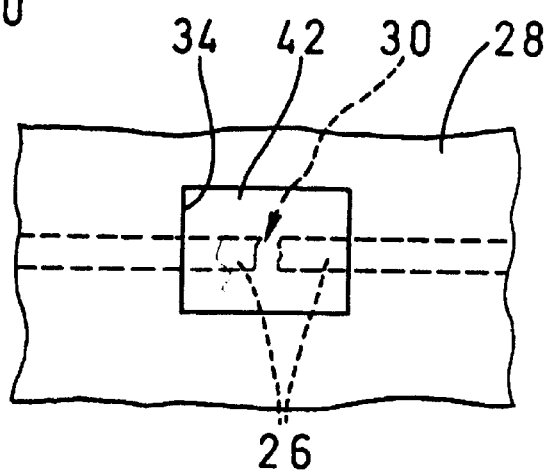

Next, as shown in FIG. 4, the target plate 36 is placed on a second stage 35 placed on the first stage 20 equipped with the electronic device 18 to be fixed. Appropriate pressure is applied between stages 20 and 35 by a retention apparatus, which is not shown in the drawing, to maintain a predetermined gap between the electronic device 18 and the target plate 36. The second stage 35 used in this embodiment is good enough to fix the target plate 36. In this embodiment, since the second stage 35 does not particularly require the positioning function, it is good enough to place the target 36 mounted on the second stage 35 parallel to the electronic device 18 on the first stage 20.

The electronic device 18 and the target plate 36 are arranged at a predetermined gap. As described later, however, a transfer film punched out from the target plate 36 is fitted into a recess 34 in the electronic device 18 after the transfer film is ejected out. When the gap between the electronic device 18 and the target plate 36 is too narrow to have any clearance, the electronic device 18 and the target plate 36 cannot separate because of their fusion. On the contrary, when the gap between electronic device 18 and target plate 36 is too wide, the target metals are scattered because dissolution occurs at the time of transferring the transfer film from target plate 36 to recess 34 of electronic device 18. Accordingly, an optimal value of the gap between electronic device 18 and target plate 36 is found out. The value is preferably ranging from 1 μm to 200 μm, and is particularly preferable ranging from 50 μm to 80 μm.

As shown in FIGS. 4, 5(a), and 5(b), the target plate 36 is composed by the attachment of a target thin film 40 on a transparent substrate 38 such as a glass plate. The target thin film 40 is made of preferably the material identical to that of wiring 26 to be repaired, for example, copper and aluminum may be used, however, the material is not particularly limited . . . This target thin film 40 is formed by publicly known means for adhering a metallic foil onto the transparent substrate 38 or depositing a metal on it. The transparent substrate 38 is good enough to be transparent such that ultrashort laser pulse 12 can pass through it. A glass plate is particularly preferable.

When ultrashort laser pulse 12 is applied from the back of target plate 36, i.e., the surface on which the target thin film is not formed, the laser 12 passes through the transparent substrate 38. Then target thin film 40 formed on the surface is transferred by being punched out in a surface shape where laser 12 is applied to eject it out from transparent substrate 38. Laser 12 is focused in the shape identical to recess 34 on target plate 40 in the position opposite to recess 34 formed on the electronic device 18 to apply the laser 12 having a predetermined intensity. In this case, the power density of the ultrashort pulse laser generator 10 is preferably set within the range of 0.1 to 4.0 Jule/cm² when a metal is punched out as mentioned above. The power density is preferably set around 0.8 Jule/cm² when ITO is used.

As a result, a target member 42 (transfer film) punched out from target thin film 40 of target plate 36 is fitted into recess 34 in electronic device 18 arranged opposite to target member 42 and is attached to be joined as shown in FIG. 5(a). Since target member 42 is closely adhered to the wiring 26 within the recess 34 with high energy, the target member 42 is electrically connected to the wiring 26 by alloyed junction of diffused metals. In FIG. 5(a), the clearance between the target plate 38 and the electronic device 18 is wide to illustrate a schematic structure.

In this manner, target member 42 attached onto broken wiring 26 is so electrically connected to wiring 26 that wiring 26 restores its functions. Further, the formed inner edge (cutting section) of recess 34 and the external edge or surface (cutting section) of target member 42 transferred to recess 34 are so smooth and flat that the joint of both edges is as if they were mechanically cut and fitted. Since the top face of target member 42 is exposed to the outside, a protective film is preferably attached onto it, if necessary.

One of the embodiments of the defect repair method for the electronic device and the electronic device repaired by the method according to the present invention has been described in detailed as mentioned above. The present invention is, however, not limited to the embodiments mentioned above.

Figure 6:
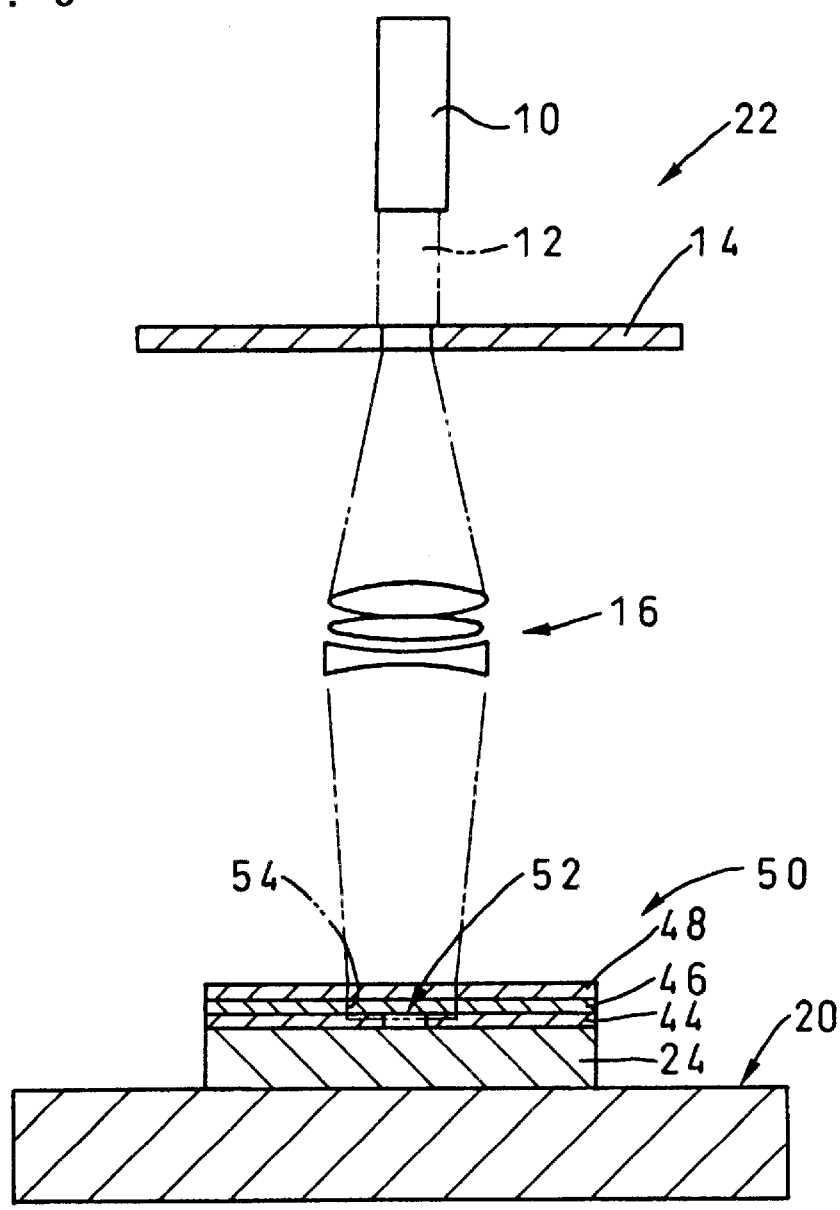
FIG. 6 is a schematic cross-sectional view for showing one process in another preferred embodiment used for a defect repair method according to the present invention.

For example, although the target member of the target plate in the above embodiment is a single layer, it may also be composed of multi layers. As shown in FIG. 6 as an example, when an electronic device 50 wherein a Cs line 44, an insulating layer 46, and a pixel electrode 48 comprising a storage capacitance section Cs are laminated, has a defect on the side of Cs line 44 tangent to the substrate 24, these three layers are replaceable with defect-free layers.

More specifically, as shown in FIG. 6, the electronic device 50 is placed on the first stage 20 in the same manner as mentioned above. The setting of positioning a defective portion 52 to be removed with ultrashort laser pulse 12 applied by the ultrashort pulse laser generator 10 and the scope of the defective portion 52 to be removed is made to focus the laser 12. Then, part of the pixel electrode 48, insulating layer 46, and Cs line 44 covering the defective portion of the electronic device 50 is removed by applying laser 12 to form a recess 54.

Figure 7:
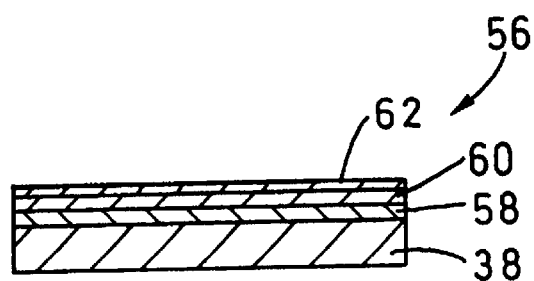
FIG. 7 is a schematic view showing an example of enlarged main parts of a target plate used in the method of repairing a defective portion of the electronic device shown in FIG. 6.

A target plate for repairing an electronic device is previously prepared. As shown in FIG. 7, a target plate 56 is formed on the transparent substrate 38, wherein a pixel electrode 58, an insulating layer 60, and a Cs line 62 are laminated in a retrograde sequence of the lamination of the electronic device 50. In this case, the material and the thickness of pixel electrode 58 in target plate 56 and insulating layer 60 is preferably the same as those of electronic device 50. Preferably, the material of Cs line 62 of target plate 56 is the same as that of electronic device 50. The film thickness of Cs line 62 of electronic device 50 is, however, preferably slightly thinner because part of Cs line 44 remains within recess 54.

Figure 8:
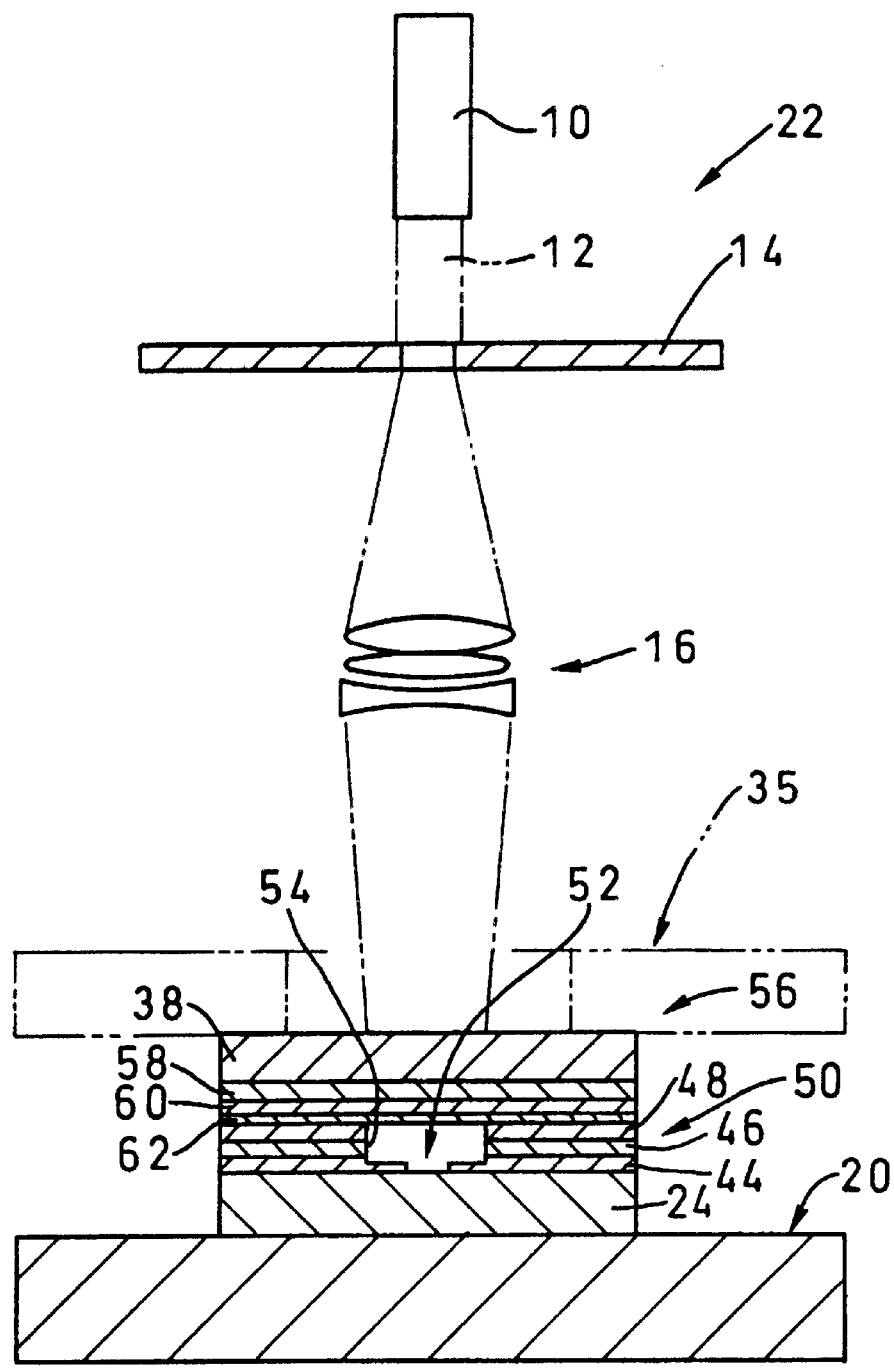
FIG. 8 is a schematic cross-sectional view of an electronic device showing a further next process in the defect repair method of the preferred embodiment shown in FIG. 6.
Figure 9:
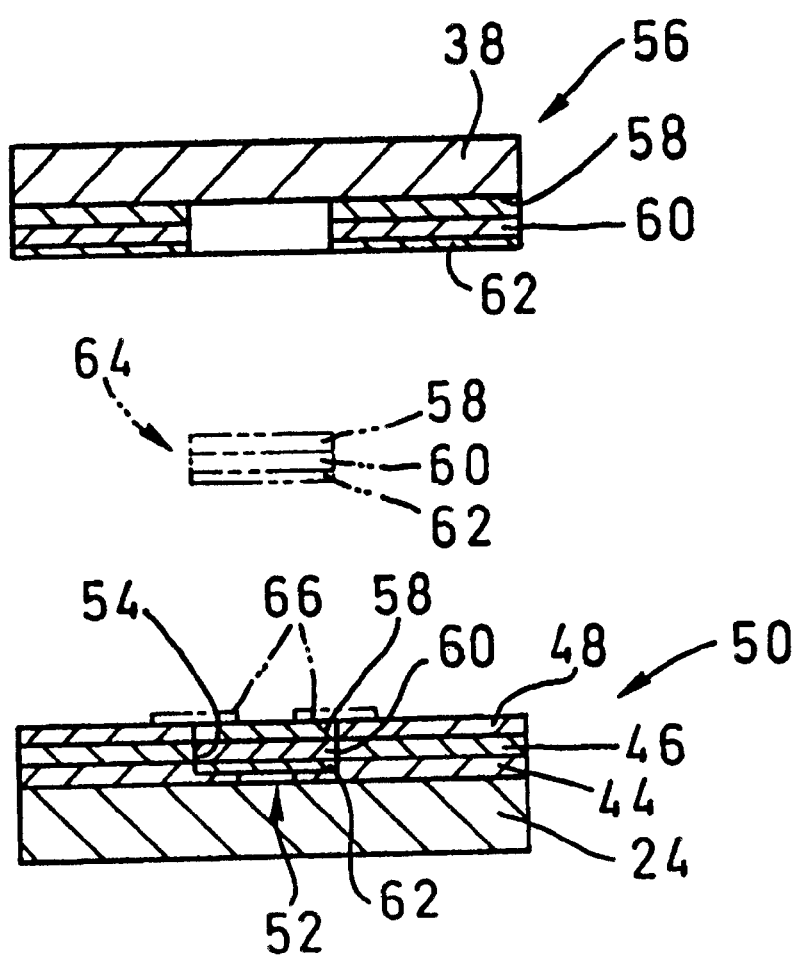
FIG. 9 is a schematic cross-sectional view showing a mechanism in the defect repair method of the preferred embodiment shown in FIG. 8.

Next, as shown in FIG. 8, the surface on which is formed a thin film of target plate 56 mounted on second stage 35 is stacked on the surface on which is formed the recess 54 of electronic device 50 and, as passing an inert gas between them, appropriate pressure is applied to them with a retention apparatus (not shown), to provide a predetermined gap between electronic device 50 and target plate 56. Then, like in the above-mentioned case, ultrashort laser pulse 12 is applied by ultrashort pulse laser generator 10, to punch out a thin-film laminate (transferred film) 64 having almost the same shape as recess 54 formed in electronic device 50 from the thin-film layer on the transparent substrate 38 of target plate 56 and fit laminate 64 into recess 54 as shown in FIG. 9. The Cs line 62 of laminate 64 thus fitted into recess 54 is electrically connected to the Cs line 44 of electronic device 50 by the alloyed junction of diffused metals. Also, insulating layer 60 and pixel electrode 58 of laminate 64 can be put in electrical continuity with insulating layer 46 or pixel electrode 48 of electronic device 50 when laminate 64 is securely fitted into recess 54 of electronic device 50. Note here that if pixel electrode 48 or 58 needs to be assured of electrical connection in particular or is found to be faulty in a continuity test, it is covered with a conductive material 66 indicated by a broken line in the figure using a publicly known technique.

As can be seen from the above, according to the present embodiment, laminate 64 having a predetermined shape is punched out from the thin-film layer formed on the target plate 56 and fitted into, i.e. transferred into recess 54 formed in a defect of the electronic device 50. During the transfer process, the laminate 64 is not melted, nor evaporated, nor overheated. Therefore, laminate 64 is not subject to changes in its configuration or properties of insulating layer 46 in particular, thus recovering the functions of electronic device 50 to 100% or near to 100%.

This defect repair method can be applied, for example, to repair a partially missing pixel electrode of an LCD. The pixel electrode has such a configuration that an insulation and an ITO are laminated on a glass substrate, so that after transferring, the whole area of the pixels and the TFT's source electrode can be put into electric continuity without damaging the transparency of the ITO, thus avoiding the formation of bright dots due to the partial defect of the pixel electrode.

As mentioned above, to repair part of an electronic device 50 comprising multi-layer thin films, in place of making a target plate 56 on which the layers are laminated in the opposite sequence to use it for recovering or repairing electronic device 50, a target plate or any other electronic device having the same configuration as electronic device 50 may also be used for repairing. In this case, since the target plate or electronic device has the same configuration as the electronic device to be repaired, the above-mentioned method cannot be used. Therefore, the electronic device is repaired as follows.

Figure 10:
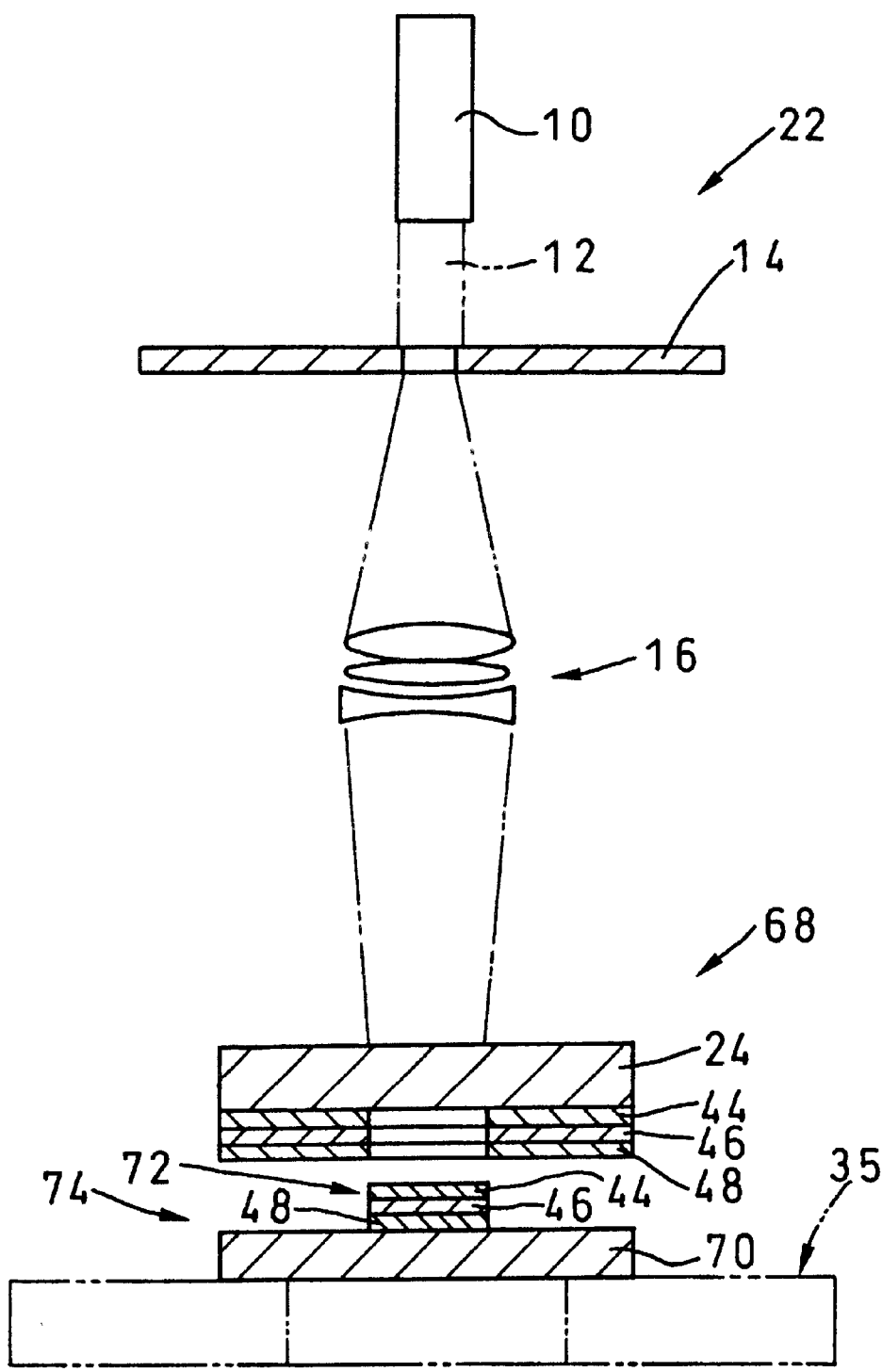
FIG. 10 is a schematic cross-sectional view of an electronic device showing one process of the defect repair method in the third preferred embodiment according to the present invention.

First, like in the above-mentioned case, a certain range containing a defective portion 52 is removed with an ultrashort laser pulse 12 to form an recess 54 (see FIG. 6). Then, as shown in FIG. 10, a target plate 68 having the same configuration as that of the electronic device 50 to be repaired is used to stack a surface on which a thin film of the target plate is formed and a transparent substrate 70 and arrange them at a predetermined gap. Next, like in the above-mentioned case, the laser pulse 12 is applied by an ultrashort laser pulse generator 10 onto the side of the transparent substrate 24 of the target plate 68, to punch out a thin-film laminate 72, having almost the same shape as that of recess 54 formed in the electronic device 50, from the target plate 68. Then laminate 72 is transferred onto a surface of transparent substrate 70 to form a second target plate 74.

In this step of transferring laminate 72 onto the surface of transparent substrate 70, if there is a fear that laminate 72 may delaminate from the surface of transparent substrate 70, it is preferable to treat the surface of transparent substrate 70 to enhance its tightness and adherence with the laminate 72. On the other hand, when laminate 72, which is a film transferred from second target plate 68, is transferred onto the electronic device 50, there is a fear that part of laminate 72 may stick to the surface of the transparent substrate 70 and remains as it is. Also, if transparent substrate 70 and laminate 72 adhere to each other too tightly, it requires much energy to transfer laminate 72 from second target plate 68 onto electronic device 50. To guard against this, a separate layer is preferably provided on transparent substrate 70 so that laminate 72 may easily stick to the separate layer and, at the same time, may easily delaminate from it when the laminate 72 is transferred. It is also preferable that the separate layer itself may delaminate and, together with laminate 72, be transferred partially onto electronic device 50. As a material of the separate layer, therefore, the most preferable one is selected according to a portion to be repaired. For example, like TFT, if the defective portion to be repaired has aluminum at its top layer, aluminum is the most preferable material for the separate layer. Further, if the defective portion has ITO at its top layer, ITO is the most preferable material for the separate layer. Furthermore, if the defective portion has an insulation at its top layer, in view of easiness in analyses, an organic material (insulator) is preferable for the separate layer, of which an α-cyano acrylate-based or silicon-based compound is desirable.

Figure 11:
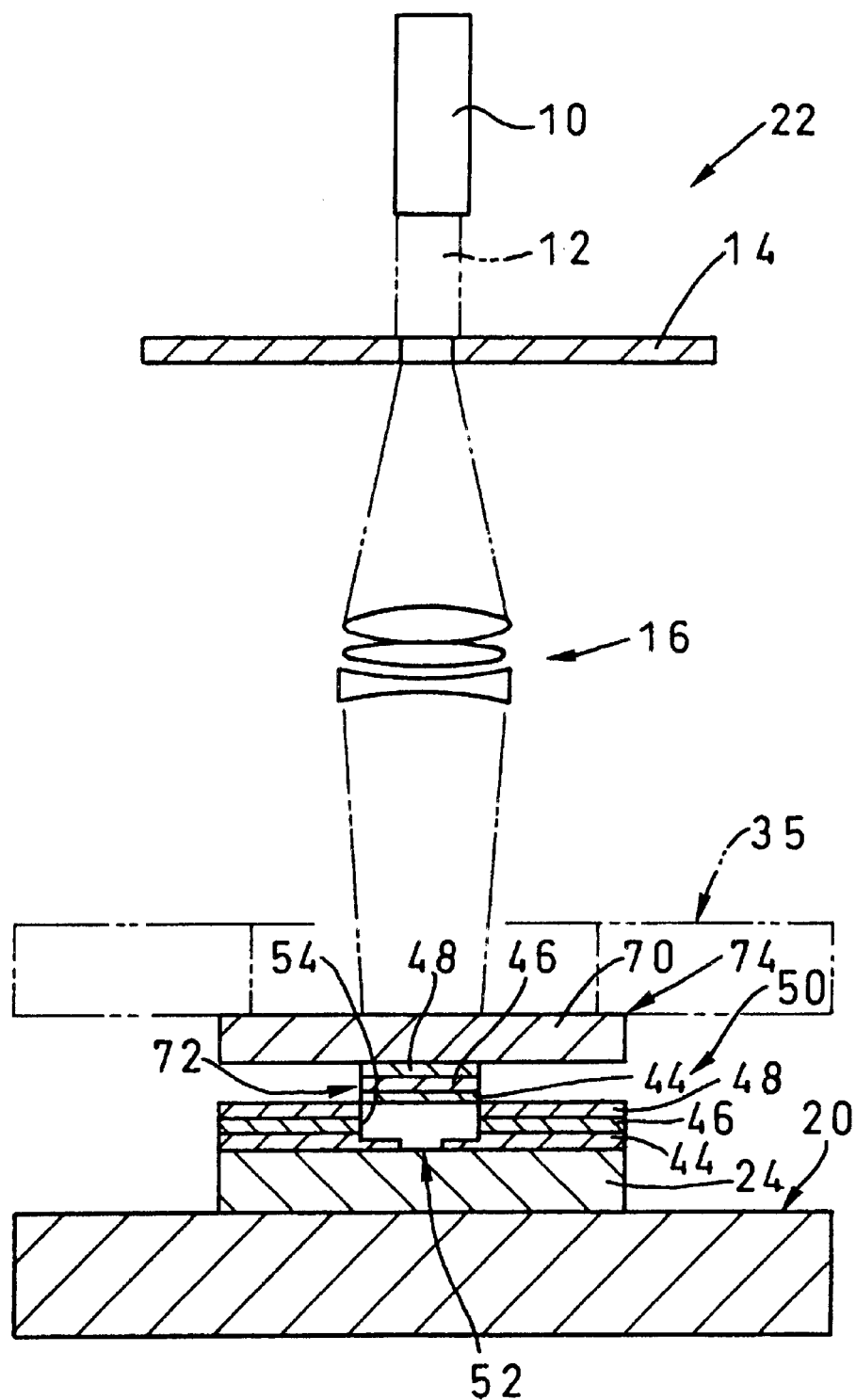
FIG. 11 is a schematic cross-sectional view showing the other process in the defect repair method of the preferred embodiment shown in FIG. 10.

Thus obtained second target plate 74 is turned upside down so that, as shown in FIG. 11, laminate 72 transferred onto target plate 74 and recess 54 in electronic device 50 may be stacked on and aligned with each other. Then, after the first stage 20 on which electronic device 50 is mounted and the second stage on which the second target plate 74 is mounted are aligned with each other relatively, an inert gas is permitted to flow between the electronic device 50 and the laminate 72 with appropriate pressure being applied thereon by a retention apparatus (not shown), so as to maintain a predetermined gap between electronic device 50 and laminate 72.

Next, like in the above-mentioned case, ultrashort laser pulse 12 is applied by ultrashort pulse laser generator 10 onto the side of the transparent substrate 70 of second target plate 74. And laminate 72 is ejected out from transparent substrate 70 to fit it into recess 54 formed in the electronic device 50. The Cs line 44 of the laminate 72 thus fitted into recess 54 is electrically connected to Cs line 44 of the electronic device 50 by an alloyed junction of diffused metals.

In this repair method, in the case of an LCD for example, it is preferable to use a pixel, which has the same configuration, formed at a place on a periphery of a panel which is not used usually, as the target plate 68 and use it as required for repair. Likewise, it is also preferable to form at a portion on a panel periphery not used usually a number of sub-pixels including a target TFT, laminate structures such as intersections between signal lines and gate lines, or single-layer structures such as signal lines or gate lines in their own forms and use them as a target plate 68. Since those target plates and the electronic device are manufactured under the same conditions, they are preferable for repair. Furthermore, it is also possible to use one of manufactured LCD panels as target plate 68. In this case in particular, a panel having a high percentage of defects is preferably re-utilized as the target plate 68.

Figure 12:
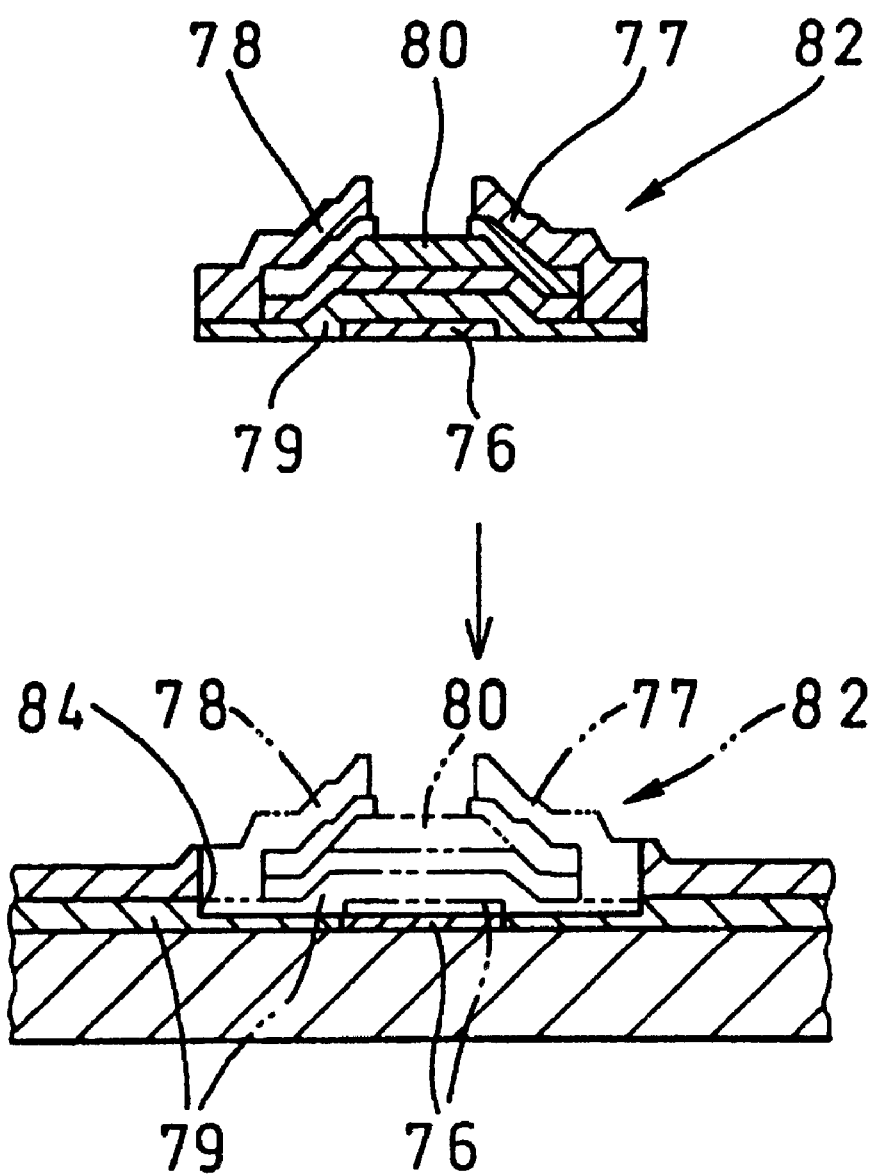
FIG. 12 is a schematic cross-sectional view of an electronic device showing one process of the defect repair method in the other preferred embodiment according to the present invention.

Also, the laminate, which acts as a transfer film, may not only simply have a thin film laminated thereon but also have a TFT structure 82, as shown in FIG. 12. TFT structure 82 has a gate electrode 76, a drain electrode 77, a source electrode 78, a gate insulation film 79, and a channel-protecting film 80. If such complicated TFT structure 82 has any defect, the structure is removed by the above-mentioned method and then, a separately formed TFT structure 82 is fitted into the recess 84. In this case, gate electrode 76 has its part left in recess 84 so that it may come in surface-to-surface contact with gate electrode 76 of TFT structure 82, which is a transfer film, to assure electric continuity. The new TFT structure 82 is fitted into the recess 84 to join a line to the Source/Drain on the panel surface to the Source/Drain. A path from the Source/Drain to the pixels/signal lines may preferably be strengthened over the connection therebetween by the prior art such as welding to secure low ohmic electric continuity.

Also a portion of the electronic device to be repaired may be part of a circuit pattern or an electrode. For example, if the electronic device is an LCD, such a portion consisting of a plurality of thin films is preferable for the present invention as an intersection of the signal line and the gate line, part of the signal line or the gate line covered by apassivation film, or a pixel electrode.

Next, at least the electronic device is preferably cooled, in each of the above-mentioned embodiments, in the step of removing the defects of the electronic device using the ultrashort laser pulse to form a recess or the step of using the ultrashort laser pulse to transfer and fit a transfer film onto the transparent substrate into the recess formed on the defective portion of the electronic device. The electronic device in this case may be indirectly cooled through the first stage on which it is mounted or directly by applying a cooling gas to a processing portion of the electronic device.

By cooling the processing portion of the electronic device, at least oxidation and burning can be prevented at the inside or periphery of the recess and the transfer film. The temperature of the electronic device and the first stage on which the device is mounted is adjusted by a flow of a cooling gas, to prevent the processing portion of the electronic device in particular from being overheated. A repair portion, on the other hand, is held at an appropriate cooling temperature in such a range as being not too low so that the transfer film may be electrically connected to the recess by an alloyed junction of the diffused or fused metals. Also, it is preferable to cool the electronic device by flowing a drying gas on its surface or putting it in a dried atmosphere so that it may not have condensation on its surface.

To prevent the processing portion of the electronic device from being oxidized, the portion is preferably processed by an ultrashort laser pulse, flowing an inert gas or a reducing gas or a mixture thereof to the processing portion. Although these gases are preferably a cooling gas, it is enough to be a room-temperature gas or a gas lower than room temperature. The inert gas used here may include a nitrogen gas, a helium gas, an argon gas, a neon gas, a xenon gas, and a carbon dioxide gas. The reducing gas may include a hydrogen gas and a carbon mono-oxide gas, being preferably a mixture with an inert gas. Also, to prevent the processing portion of the electronic device from being oxidized, the portion may be processed by the laser in a vacuum or a depressurized chamber.

Although it is necessary to hold an electronic device to be repaired and a target plate apart from each other by a predetermined distance ranging from 1 $\mu$m to 200 $\mu$m, it is very difficult to adjust this distance mechanically. It is, therefore, preferable to flow an inert gas etc. between the electronic device and the target plate to increase the distance therebetween by use of an inner pressure of the gas at the same time as applying pressure on the electronic device and the target plate to decrease the distance, thus adjusting the distance by balancing both pressures. By providing such a configuration, the distance between the electronic device and the target plate can be set easily and, at the same time, when transferring is performed, the electronic device and the target plate can be prevented from being connected to each other. Further, it is possible to prevent oxidation of the repair portion of the electronic device and its vicinity and to suppress a thermally affected range small by use of the cooling effect.

Although, in the above-mentioned embodiments, the first step is performed for cutting away a defective portion of the electronic device from its surface using an ultrashort laser pulse, the means for cutting away the defect is not limited to the ultrashort laser pulse. For example, any other laser or an electron beam or an ion beam may be used to cut off the defective surface. A photolithographic method may also be used to etch away the defective portion of the electronic device.

Although the present invention has been described with reference to its embodiments and accompanying drawings in terms of the electronic devices relating thereto and the methods and apparatuses for repairing defects of the electronic devices, of course the present invention is not limited to the above-mentioned embodiments.

For example, when repairing a defective portion of an electronic device by removing the defective portion, it is not necessary to remove it down to its bottom layer of the thin film. It is enough to remove at least the layer having the defect. Also, the defective layer is not limited to the above, coming in any type.

Further, although as the electronic device to which the present invention is applied, particularly an LCD is the most preferable which is made by micro-processing, an image sensor or any other electronic device such as a semiconductor device which requires a thin-film lamination and micro-processing is also preferable. The present invention may be subject to improvements, changes, and modifications based on the knowledge of those skilled in the art without departing from the spirit of the invention.

An electronic device according to the present invention has a flaw that a transfer film has been fitted into part of the component element but has the same or the equivalent functions at that element as well as at other component elements. Accordingly, thus obtained electronic device can provide a perfect product having no point, region or location defects. The electronic devices on which the present invention is applicable are the devices which have repeated complicated processes and a high percentage of defects, which results in a high cost.

A method and an apparatus for repairing a defective portion of an electronic device according to the present invention are capable of removing only point defects, regions or locations of the electronic device to transfer a transfer film consisting of thin films into the resultantly formed recess without changing the physical properties. In transferring of this transfer film, the thin films laminated on a transparent substrate are cut into an arbitrarily predetermined shape using an ultrashort pulse laser, in particular femtosecond laser, so that the resultantly obtained transfer film is transferred to other portions without being melted. The cutting surface obtained using the ultrashort pulse laser is very smooth and flat, so that the transfer film can be transferred onto the recess formed in the electronic device and fitted in tightly. As a result, thus recovered electronic device will have the same functions as it originally had.

Having thus described our invention, what we claim as new and desire to secure by Letters Patent is:

1. A method of repairing a defective portion included in an electronic device in which a plurality of thin films are laminated on a substrate and part of said thin films are formed on a predetermined circuit pattern, comprising the steps of:

removing said thin films covering the defective portion and its surrounding portion to form a recess and exposing the lower layers of said thin films; and fitting a transfer film into said recess to attach the transfer film onto said exposed thin films.

2. The method of repairing a defective portion of the electronic device according to claim 1, further comprising a step of closely arranging said electronic device having said recess and a target plate in which a single thin film or a plurality of thin films forming said transfer film to be fitted into the recess laminated on a transparent substrate at a predetermined gap.

3. The method of repairing a defective portion of the electronic device according to claim 2, wherein the step of closely arranging said electronic device and the target plate is the step of providing a predetermined gap of 1 $\mu$m to 200 $\mu$m therebetween.

4. The method of repairing a defective portion of the electronic device according to claim 2, wherein the step of exposing said thin films is the step of removing thin films covering the defective portion and its surrounding portion by the application of ultrashort laser pulse.

5. The method of repairing a defective portion of the electronic device according to claim 2, wherein the step of fitting said transfer film into said recess is the step of fitting the transfer film into the recess by the application of ultrashort laser pulse.

6. The method of repairing a defective portion of the electronic device according to claim 2, further comprising the step of passing an inert gas or a reductive gas into the clearance between the target plate and the electronic device.

7. The method of repairing a defective portion of the electronic device according to claim 2, further comprising a step of maintaining the predetermined gap between the electronic device and the target plate by the balance of pressure of an inert gas or a reductive gas applied to the clearance between said electronic device and said target plate, and pressures applied to said electronic device and said target plate to bring them closer.

8. The method of repairing a defective portion of the electronic device according to claim 1, further comprising a step of forming a target plate in which thin films are laminated in a retrograde sequence of said thin films laminated on the substrate in said electronic device.

9. The method of repairing a defective portion of the electronic device according to claim 1, further comprising the steps of:

closely arranging said electronic device having said recess and a target plate in which a single thin film or a plurality of thin films forming said transfer film to be fitted into the recess laminated on a transparent substrate at a predetermined gap;

transferring said transfer film to be fitted into said recess from said target plate to said other transparent substrate; and closely arranging said other transparent substrate to which said transfer film is transferred and said electronic device in which said recess is formed at a predetermined gap.

10. The method of repairing a defective portion of the electronic device according to claim 9, further comprising a step of forming a separate layer for allowing said transfer film to be easily separated on the surface of said other transparent substrate.

11. The method of repairing a defective portion of the electronic device according to claim 1, wherein the step of exposing said thin films is the step of removing thin films covering the defective portion and its surrounding portion by the application of ultrashort pulse laser.

12. The method of repairing a defective portion of the electronic device according to claim 11, wherein the step of fitting the transfer film into the recess by the application of femtosecond laser having a pulse width ranging from several femtoseconds (fs) to several thousand femtoseconds (fs).

13. The method of repairing a defective portion of the electronic device according to claim 11, wherein the step of exposing said thin films or the step of fitting said transfer film into said recess is performed under cooling.

14. The method of repairing a defective portion of the electronic device according to claim 11, wherein the step of exposing said thin films or said step of fitting said transfer film into said recess is performed in the presence of an inert gas.

15. The method of repairing a defective portion of the electronic device according to claim 1, wherein the step of fitting said transfer film into said recess is the step of fitting the transfer film into the recess by the application of ultrashort laser pulse.

16. The method of repairing a defective portion of the electronic device according to claim 15, wherein the step of exposing said thin films or the step of fitting said transfer film into said recess is performed under cooling.

17. The method of repairing a defective portion of the electronic device according to claim 1, wherein the step of exposing said thin films or the step of fitting said transfer film into said recess is performed under cooling.

18. The method of repairing a defective portion of the electronic device according to claim 1, wherein the step of exposing said thin films or the step of fitting said transfer film into said recess is performed under vacuum or under reduced pressure.

* * * * *